United States Patent [19]
Cairns

[11] Patent Number: 5,685,727
[45] Date of Patent: Nov. 11, 1997

[54] UNDERWATER MATEABLE CONNECTOR

[75] Inventor: James L. Cairns, Ormond Beach, Fla.

[73] Assignee: Ocean Design, Inc., Ormond Beach, Fla.

[21] Appl. No.: 634,923

[22] Filed: Apr. 19, 1996

Related U.S. Application Data

[63] Continuation-in-part of Ser. No. 375,957, Jan. 20, 1995.
[51] Int. Cl.[6] ................................................. H01R 13/44
[52] U.S. Cl. .................... 439/139; 439/201; 439/310; 439/271; 385/56; 385/58
[58] Field of Search .......................... 439/143, 145, 439/139, 201, 587, 589, 310, 271; 385/56, 58, 60

[56]                References Cited

U.S. PATENT DOCUMENTS

| | | | |
|---|---|---|---|
| 3,982,804 | 9/1976 | Marechal | 439/139 |
| 4,203,640 | 5/1980 | Bice et al. | 439/139 |
| 4,616,900 | 10/1986 | Cairns | 350/96.2 |
| 4,666,242 | 5/1987 | Cairns | 350/96.21 |
| 4,795,359 | 1/1989 | Alcock et al. | 439/271 |
| 5,194,012 | 3/1993 | Cairns | 439/201 |
| 5,234,350 | 8/1993 | Marechal et al. | 439/139 |

FOREIGN PATENT DOCUMENTS

| | | | |
|---|---|---|---|
| 0538089 | 4/1993 | European Pat. Off. | G02B 6/38 |
| 615452 | 7/1935 | Germany | 439/139 |
| 1356080 | 11/1987 | U.S.S.R. | 439/139 |

*Primary Examiner*—Gary F. Paumen
*Attorney, Agent, or Firm*—Brown, Martin, Haller & McClain

[57]             ABSTRACT

An underwater optical or electrical connector has a plug unit containing at least one contact probe and a receptacle unit containing at least one contact member. Each unit has an end wall having an opening aligned with the respective contact probe or member, and the units are adapted to be coupled together with the end wall openings in alignment and the probe projecting through the aligned openings into contact with the contact member. A seal member is rotatably mounted behind each end wall and the end wall and seal members are relatively rotatable between sealed positions in which each end wall opening is sealed and open position in which a port in each seal member is aligned with the respective end wall opening. A biasing device in each unit pushes an overlying portion of each seal member through the end wall opening to seal the opening in the closed position.

14 Claims, 4 Drawing Sheets

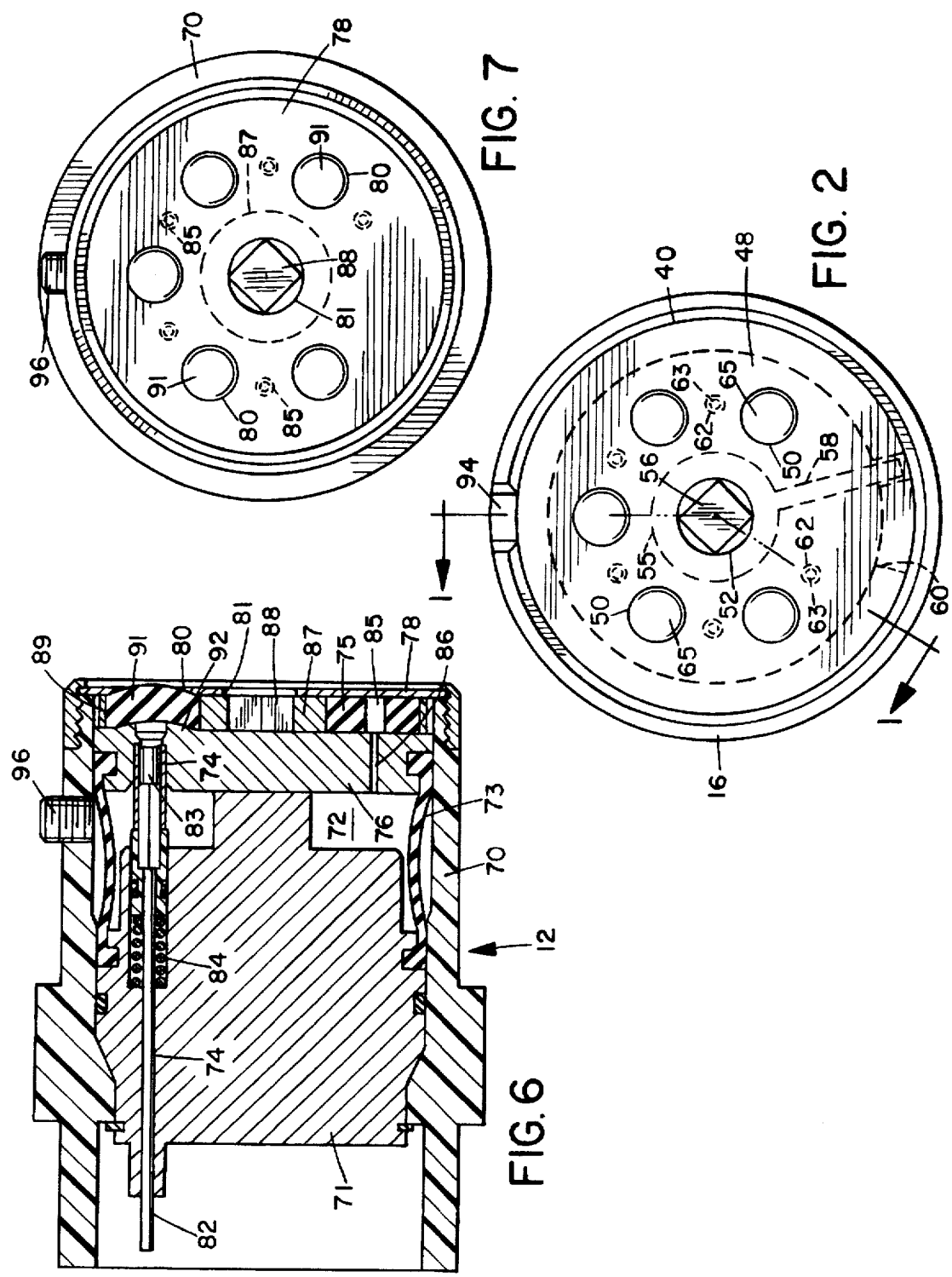

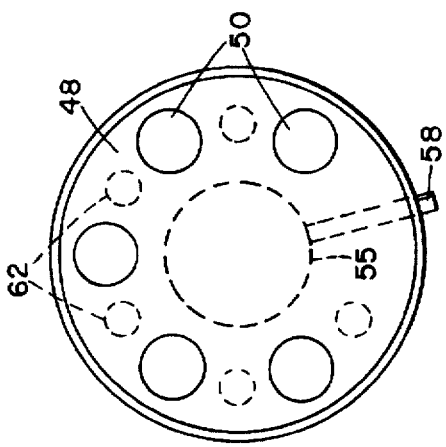
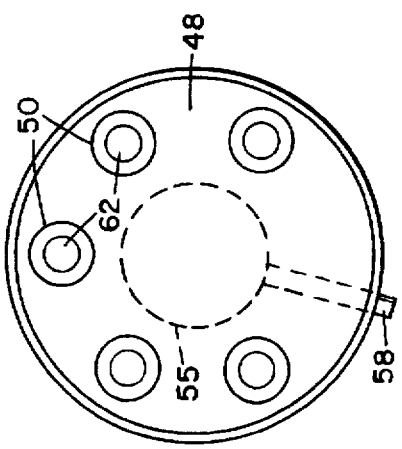
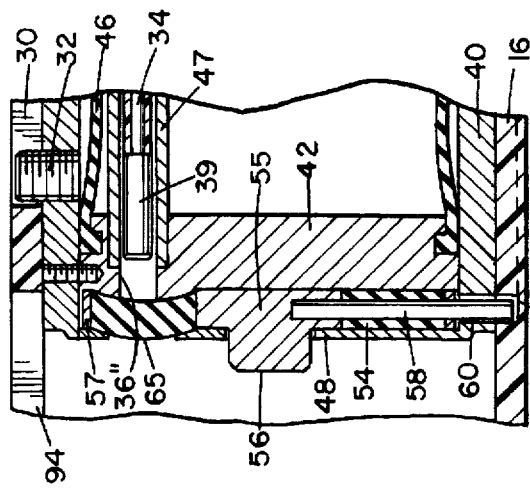
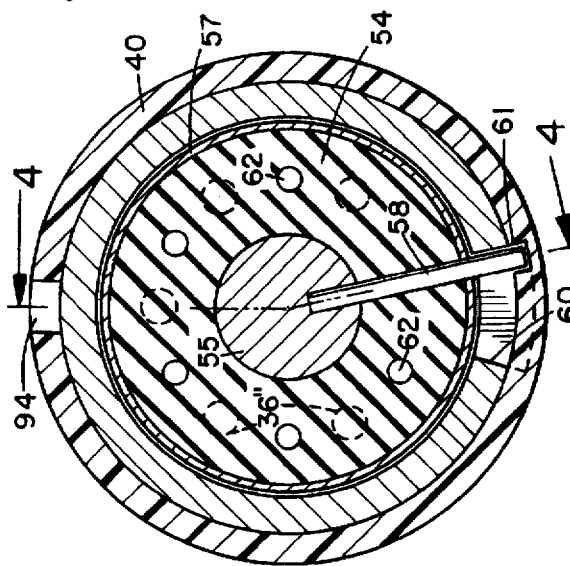
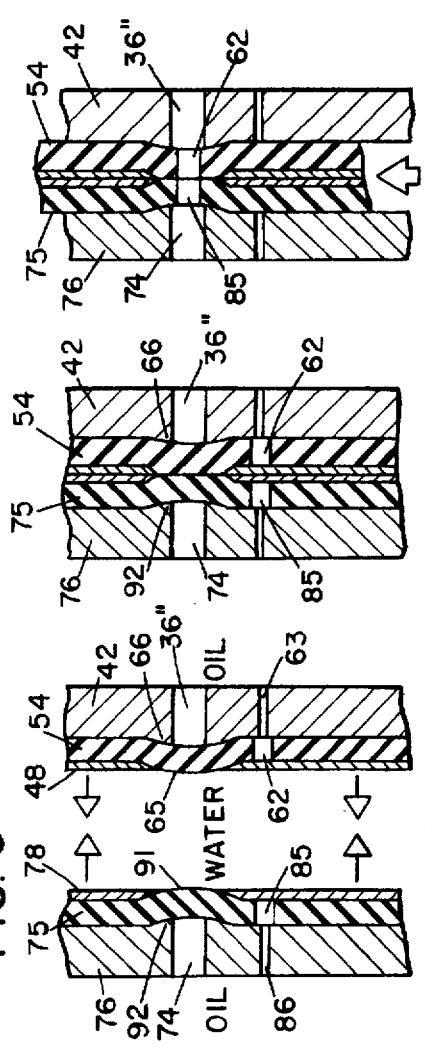

1

UNDERWATER MATEABLE CONNECTOR

CROSS-REFERENCES TO RELATED APPLICATIONS

This application is a Continuation-In-Part of copending application Ser. No. 08/375,957 filed Jan. 20, 1995.

BACKGROUND OF THE INVENTION

This invention relates to an underwater connector for making connections of electrical, fiber-optic, and hybrid electro-optical cables in a hostile or underwater, high pressure environment.

There are many types of connectors for making electrical and fiber-optic connections in hostile environments. One category includes connectors intended for sub-sea mating and demating. Such underwater connectors typically comprise a receptacle or female connector connected to one cable end and a plug or male connector connected to the other cable end and designed for mating engagement with the receptacle. These parts must be designed such that they can be connected underwater, and can be repeatedly mated and demated underwater. In one type of underwater connector, the receptacle and socket are filled with dielectric fluid or a semi-mobile compound. The female portion or receptacle contains electrical or optical connections in a sealed chamber. The male portion or plug has one or more contact probes which enter the chamber and contact the female contact elements to make the connection. One major problem is in ensuring that seawater cannot enter the connection and that fluid in the connectors cannot leak out.

A number of different sealing mechanisms have been devised in the past for sealing the connectors as the connection is made. One such sealing mechanism has an opening into the mating chamber which comprises an elastomeric tubular entrance surrounded by an elastomeric sphincter that pinches the entrance closed upon itself, in the unmated condition. In the mated condition, the sphincter pinches against the entering probe in the mated condition. Although this type of seal is successful in some cases, it does have some drawbacks. One drawback is that seals of this type do not work well in all conditions. Another drawback is that such seals will lose their "memory" after they have been mated and demated a number of times, and will then fail to close quickly enough to isolate the chamber from the surrounding environment.

In some known underwater electrical connectors, such as that described in my U.S. Pat. Nos. 4,795,359 and 5,194,012, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in an optical connector since the optical contacts must be able to engage axially for practical purposes.

Underwater electro-optical connectors are described in U.S. Pat. Nos. 4,616,900 and 4,666,242 of Cairns. In U.S. Pat. No. 4,666,242, the male and female connector units are both oil filled and pressure balanced. This device utilizes a penetrable seal element having an opening which pinches closed when the units are separated. Other known fiber-optic connectors have similar seals which are not suitable for use under some conditions and may tend to lose effectiveness after repeated mating and demating.

These and other known mechanisms for providing repeatable, reliable optical and electrical connections in a hostile environment are not completely effective. The optical connectors presently available are extremely expensive and generally require complicated means for terminating the connector elements to the cables they are intended to connect. Up to now, none of the known connectors have been ideal for making repeated and reliable optical and electrical connections in hostile environments such as the greatest ocean depths.

SUMMARY OF THE INVENTION

It is an object of the present invention to provide a new and improved connector for making connections between optical fiber cables, electrical cables, or electro-optical cables in hostile environments, such as underwater.

According to the present invention, an underwater connector is provided which comprises a receptacle unit having a first end for connection to a cable and a second end, the second end having at least one opening, a chamber connected to the opening, and a contact junction member mounted in the chamber, a first seal member rotatably mounted in the receptacle unit whereby relative rotation between the first seal member and second end moves the opening between a sealed position in which the seal member seals the opening to block the connection from the opening to the chamber and an open position in which the opening is connected to the chamber, and a plug member having a first end for connection to a second cable and a second end, the second end of the plug member having at least one opening, a contact probe mounted in the plug member in alignment with the opening for extending through the opening and into the receptacle unit chamber when the units are coupled together. Preferably, a second seal member is rotatably mounted in the plug member for normally sealing the opening, and relative rotation between the plug member and second seal member moves the opening between a first, sealed position and a second, open position in which the two openings are aligned to allow the contact probe to enter the receptacle chamber and connect to the contact junction. Preferably, each seal member is biased to project partially outwardly through the respective opening in the closed position.

Preferably, a keying mechanism is provided for producing the necessary relative rotation between each seal member and end plate as the plug and receptacle units are coupled together so that the connection can be made without allowing entry of seawater into the assembly. When the plug and receptacle units are separate, the end openings will be sealed. As the two end faces are brought into engagement, the projecting seal portions will be compressed, providing a better seal. Subsequently, the keying mechanism will engage to provide relative rotation between each end face or end plate and the underlying seal member, producing a wiping action which will tend to force any moisture out of the joint as the seal members are positioned in the open position.

In a preferred embodiment, one end plate has a central opening aligned with a rigid socket at the center of one of the seal members, while the other end plate has a central opening through which a rigid pin member coupled to the other seal member projects. As the plug and receptacle units are coupled together, the pin member enters the socket and mating keying formations on the pin and socket couple the two seal members together so they will rotate as a unit. At the same time, a keying mechanism between the seal members and the plug unit causes the coupled seal members to rotate into a position in which an opening in each seal member is aligned with the respective end plate opening.

Subsequently, the contact probe is extended through the seal openings and brought into contact with the contact junction to make the connection.

Preferably, each receptacle unit has a plurality of contact junctions and the plug unit has a corresponding number of contact probes. Each unit end face or plate has an equivalent number of openings for alignment with the respective contact junctions and probes. Each seal member also has the same number of openings, which are offset from the openings in the end plate in the sealed position, and aligned with the end plate openings in the open position.

This arrangement provides a much more effective seal, with the projecting portions of the seal members having a squeegee-like wiping action as they rotate over the opposing seal portion, tending to force any moisture out from the region between the plates before the openings are aligned, and reducing the risk of moisture from the external environment entering the connection.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 2 is an end elevational view illustrating the mating end face of the plug unit;

FIG. 3 is a sectional view of the seal member on the lines 3—3 of FIG. 2;

FIG. 4 is a section on the lines 4—4 of FIG. 3;

FIG. 6 is a cross-sectional view of a receptacle unit for mating engagement with the plug unit of FIGS. 1–5;

FIG. 7 is an end elevational view illustrating the front or mating end face of the receptacle unit;

FIGS. 8A and 8B are schematic cross-sectional views of the end plate and seal member of the plug unit illustrating the sealed and open positions of the seal member, respectively;

FIGS. 9A, 9B and 9C are enlarged partial cross sectional views through part of the seal member and end wall of the plug and receptacle unit in successive stages of the seal operation.

DESCRIPTION OF THE PREFERRED EMBODIMENT

Figure 10:
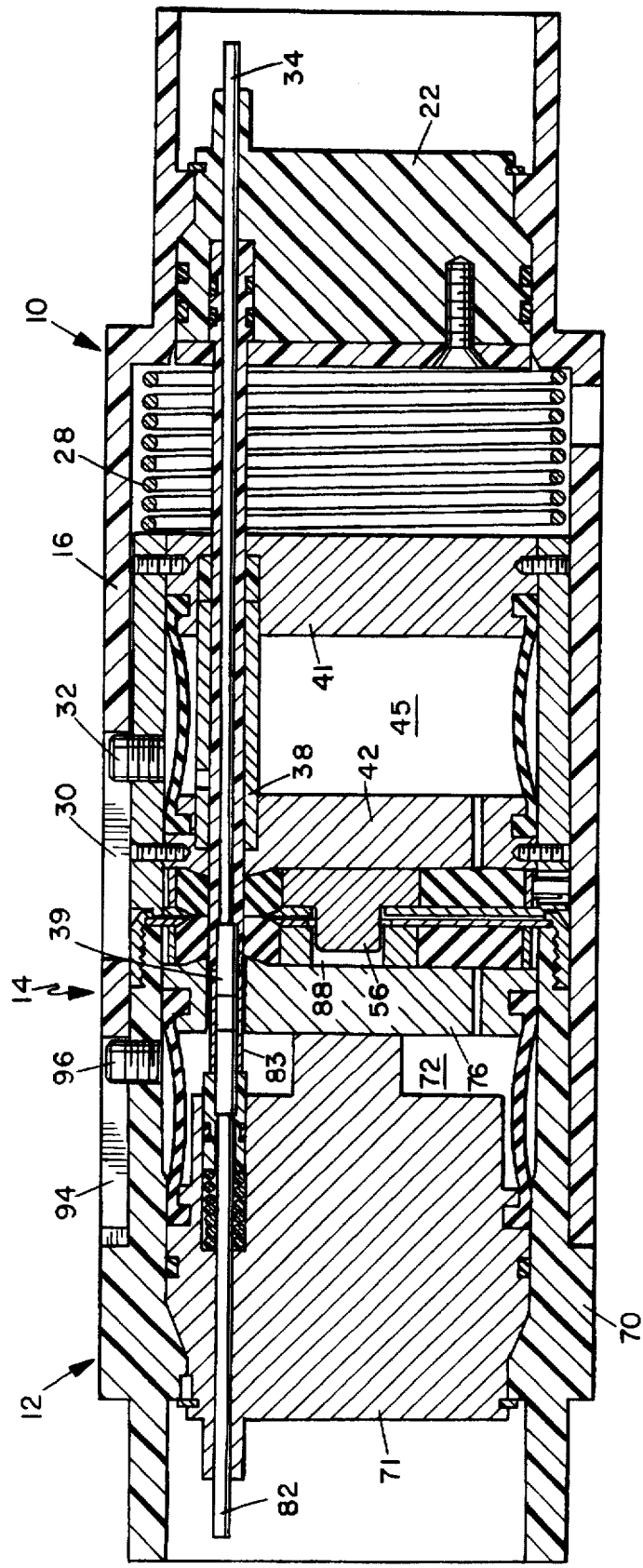
FIG. 10 is a longitudinal cross-section through the plug and receptacle units when connected together with the contact elements in engagement.

The drawings illustrate an underwater connector for connecting electrical, optical or electro-optical cables. In the following description, a connector for fiber-optic connections is described. However, it will be understood that the same mechanism may be used for connecting electrical cables or combined electro-optical cables. The connector comprises a plug unit 10 as illustrated in FIGS. 1–5 and a receptacle unit 12 as illustrated in FIGS. 6 and 7 which interconnect to form an integral cylindrical connector 14, as illustrated in FIG. 10. The units are made of any suitable rigid material, such as hard plastic, metal or the like. One of the units will be connected to a first cable end (not illustrated) in a conventional manner, while the other unit is connected to a second coaxial cable end (also not illustrated). In the illustrated embodiment, the connector is designed to connect five optical fibers. However, it may alternatively be designed to connect a greater or smaller number of fibers, depending on the application, and that the optical fibers may be replaced with electrical leads in alternative, electrical connector embodiments.

The plug unit 10 basically comprises a cylindrical outer shell or casing 16 having an internal chamber 18 which is sealed at the terminal end 20 by end plug 22. A plug contact manifold 24 is slidably mounted in the chamber 18 at the opposite, connector end 26 of the unit 10, and is biased away from the end plug 22 by spring 28 which acts between the opposing ends of the end plug and contact manifold. The outer shell 16 has a first, linear keyway or slot 30 and a key or guide pin 32 projects radially outwardly from the manifold 24 for engagement in slot 30, so that the manifold is free to slide axially in chamber 18 but cannot rotate.

Figure 1:
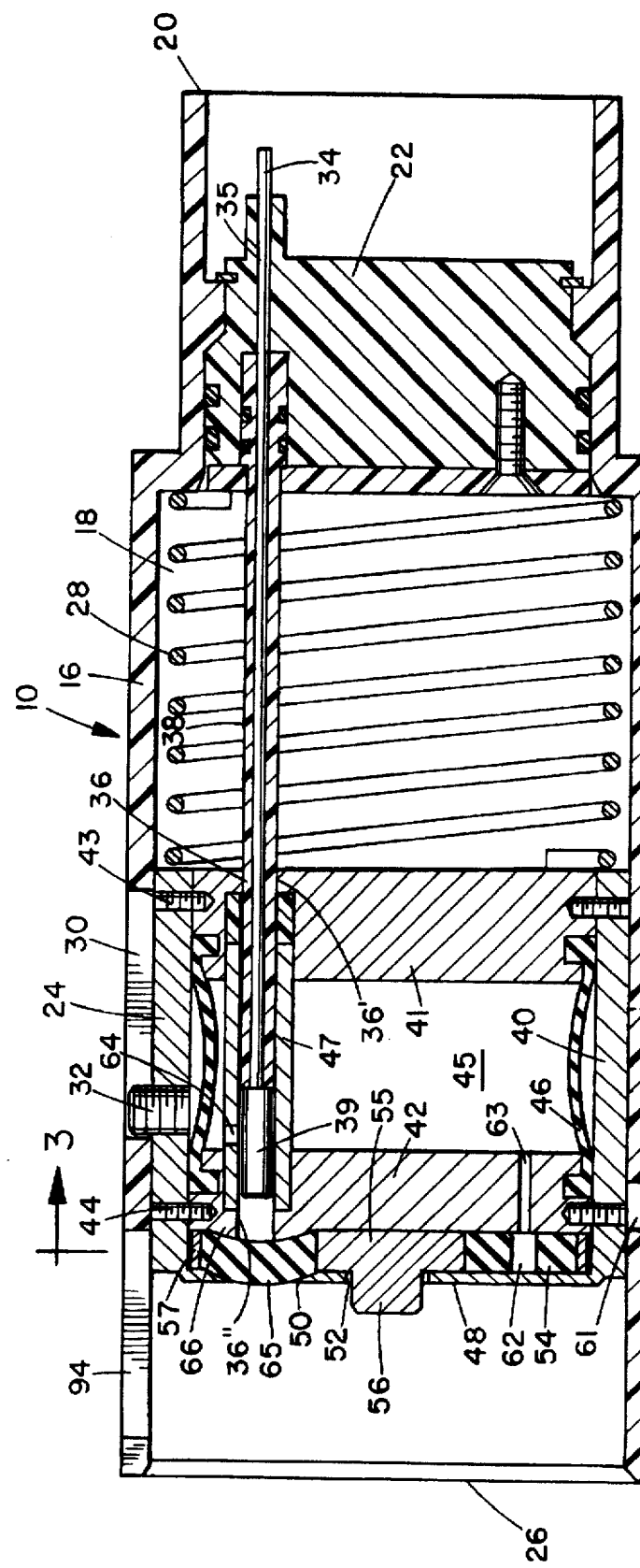
FIG. 1 is a cross-sectional view of a plug unit forming a first part of a connector assembly according to a preferred embodiment of the invention.

A series of optical fibers 34, only one of which is visible in FIG. 1, extend through aligned tubular bores 35,36 in the end plug 22 and contact manifold 24, respectively. Each fiber 34 is received in a tubular housing 38 which is fixed at one end in end plug 22 and extends into the aligned bore 36 in manifold 24. The fiber terminates to an alignment ferrule 39 in a known manner. The ends of fibers 34 at the terminal end 20 of the plug unit are suitably arranged for connection to fibers in a cable, in a conventional manner.

The contact manifold 24 comprises an outer cylindrical casing or housing 40 to which opposite end plates 41,42 are secured by sets of connecting screws 43,44, respectively, forming an internal chamber 45 between the end plates. Chamber 45 has a flexible peripheral wall 46. The bore 36 includes aligned bore portions 36' and 36" in end walls 41 and 42 for receiving the tubular housing 38 containing each optical fiber. Rigid guide sleeves 47 extend through the chamber 45 between the aligned bore portions 36',36" for guiding the optical fiber through the chamber. The outer housing 40 has an integral end wall 48 at the connector end 26 of the plug unit. End wall 48 has a series of spaced openings 50 corresponding in number to the number of bores 35,36 for receiving optical fibers, in this case five, as best illustrated in FIG. 2. The openings 50 are aligned with the respective bores 36',36" in the end plates of the contact manifold. The end wall 48 also has a central opening 52.

Figure 5:
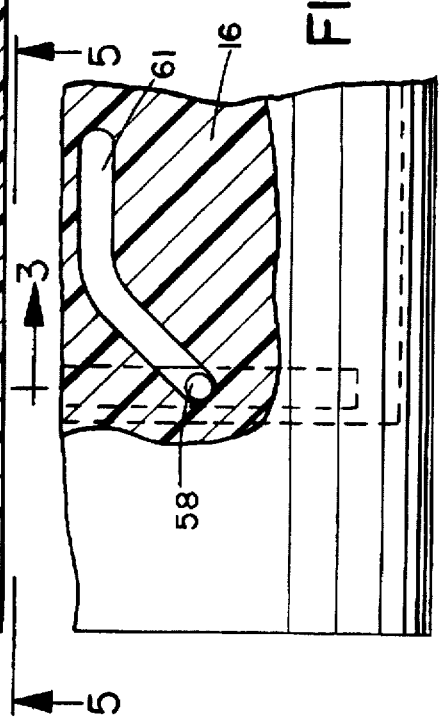
FIG. 5 is a side elevational view of the plug unit, partially broken away to illustrate the engagement between an actuator key on the seal member and a keyway on the plug shell.

An annular seal member 54 of elastomeric material is sandwiched in the space between the end wall 48 and end plate 42, and is arranged to form a seal between each opening 50 and the corresponding bore portion 36" when the unit is disconnected. The seal member 54 is rotatable relative to the contact manifold, and has a central core 55 of rigid material. A pin or post 56 of square cross-section projects outwardly from core 55 through the central opening 52 in end wall 48. A circular outer rim 57 of rigid material is bonded around the periphery of the flexible seal member 54 for added support. A radial key 58 projects outwardly from member 55 through a slot in member 54 and outwardly through an aligned, arcuate slot 60 in outer housing, as best illustrated in FIG. 3. This permits the outer housing 40 and the seal member 54 to rotate relative to one another by a distance corresponding to the length of slot 60. The projecting end of key 58 engages in a keyway 61 in the inner surface of the outer shell 16, as best illustrated in FIG. 5.

The seal member 54 also has a series of spaced openings or through bores 62 which are equal in number to the number of optical fibers to be connected, and thus the number of bores 36, and which are at a spacing equivalent to the spacing between holes 50 in the end wall 48 and the bores 35,36 in the end plates 22,41 and 42, respectively. In addition to the bores 36" in end plate 42 which receive the optical fibers, the end plate 42 also has a series of bleed orifices 63 of smaller dimensions. When the seal member 54 is in the closed position illustrated in FIGS. 1 and 3, the bores 62 are offset from openings 50, but each bore 62 is aligned with a bleed orifice 63. The expansion chamber 45 is designed to be filled with a suitable fluid for pressure equalization as the connector is submerged to great ocean depths, with the bladder or flexible wall 46 providing pressure compensation. Chamber 45 may be filled with a dielectric, optically clear fluid or oil, which will also fill the free spaces in bores 36" via ports 64 in the guide sleeves 47. Bleed orifices 63 aligned with bores 62 allow fluid from chamber 45 to fill the bores 62 when the seal member is in the closed position illustrated in FIG. 1.

It will be understood that the outer end face or wall 48 of the plug unit is exposed to the external environment, for example seawater when the connector is used to make connections at relatively deep ocean depths. It is important to ensure that seawater cannot enter the contact manifold via the openings 50. Therefore, portions of the seal member 54 underlying the openings 50 in the closed position are preferably biased outwardly through the openings 50, forming outwardly projecting bumps or portions 65, as best illustrated in FIGS. 1 and 9A. This is achieved by the provision of outwardly projecting bumps 66 on the underlying portions of end plate 42 at each bore or passageway 36". Discrete bumps 65,66 or alternatively shaped projections may be provided on the outer face of plate 42 to achieve the objective. Due to the resiliency of the material of seal member 54, the rigid bumps 66 on the underlying end plate 42 will urge the overlying portions of seal member 54 outwardly to form bumps or projecting portions 65. Since portions 65 of the seal member 54 fill each opening 50 and project outwardly from the opening in the unmated, closed position of FIGS. 1 and 9A, seawater cannot enter the opening.

The receptacle unit 12 will now be described in more detail with reference to FIGS. 6 and 7. Unit 12 basically comprises an outer cylindrical shell 70 in which contact manifold 71 is mounted. Manifold 71 defines an annular sealed chamber 72 with a flexible outer wall 73 forming an expandable chamber which contains a suitable, optically clear dielectric fluid or oil. A series of through bores 74 extend through contact manifold 71 at spacings and positions corresponding to the spacing and positions of the through bores 35,36 in the plug unit 10. Optical fibers 82 extend into bores 74 in the manifold 71 and terminate in alignment ferrules 83. A spring 84 in each bore 74 biases the ferrule into the contact position illustrated in FIG. 4.

As in the plug unit, an annular seal member 75 of resilient material is sandwiched between an end wall 76 of manifold 71 and end wall 78 of the outer shell 70. The shell end wall 78 also has spaced openings or ports 80 aligned with bores 74, and the connection between each port 80 and the aligned bore 74 in the contact manifold is sealed by seal member 75 in the closed position illustrated in FIGS. 6 and 7. Shell end wall 78 also has a central opening 81, as best illustrated in FIG. 5. The annular seal member 75 has a series of openings or ports 85 at the same spacing as the ports 80 but offset from the ports in the closed position illustrated in FIGS. 6 and 7. Manifold end wall 76 has a series of bleed orifices 86 which are aligned with ports 85 in the closed position and connect each port to the oil chamber 72, whereby each port 85 will be filled with dielectric oil when the device is in the closed position.

A rigid central core or disc 87 is secured at the center of seal member 75. Center disc 87 has a central opening 88 of square cross-section for mating engagement with the central post of the plug seal member, as will be explained in more detail below. Clearly, other shapes may be used for the mating post and opening of the two seal members, as long as relative rotation between the two seal members is prevented when post 56 engages in opening 88. Additionally, the core of seal member 75 may alternatively be provided with a projecting post of square or otherwise faceted cross-section, while a matching central opening is provided in the core 55 of the plug seal member. The seal member 75 also has an outer ring or rim 89 of rigid material for added stability.

As with the plug unit, the seal member in the receptacle unit is also biased so that portions or raised bumps 91 project outwardly through openings 80 in the closed or sealed position, as illustrated in FIGS. 4 and 9A. This is achieved by means of raised bumps 92 on the outer surface of manifold end wall 76 surrounding the outlet end of each bore 74, which will bias overlying regions of the resilient seal member outwardly through the aligned openings 80.

The outer shell 16 of the plug unit has a keyway 94 with an outlet end at the outer or connector end 26 of the plug unit, while the outer shell 70 of the receptacle unit has an outwardly projecting key 96 which will enter the outlet end of keyway 94 as the two parts are brought together, as illustrated in FIGS. 9 and 10. This ensures that the units are in the correct relative orientation as they are secured together. Initially, the parts are urged axially towards each other with the two seal members in the closed position, as illustrated in FIG. 8A and 9A. It will be understood that the receptacle unit seal will be in an equivalent orientation to the plug unit seal relative to the front end wall when in the closed position, as indicated in dotted outline in FIGS. 2, 7 and 8A. Seawater will be located in the space between the outer end walls 48,78 of the plug and socket units, while the space behind the end walls or plates 42 and 76 is filled with oil.

As the two units are brought closer together, the key 96 will enter keyway 94 just as the pin or post 56 engages in matching opening 88, maintaining the units in the correct orientation and preventing rotation of the two seal members. The opposing projections 91 and 65 of the two seal members will be brought into engagement and will be compressed, as illustrated in FIG. 9B. As the two end walls 48 and 78 are brought together into face-to-face engagement, the projecting portions 65 and 91 of each seal member will first engage, and will compress to urge any seawater out of the space between the opposing faces, in a squeegee like action.

As the receptacle unit continues to be urged inwardly into the plug shell, the plug manifold will be pushed inwardly, starting to compress spring 28. At the same time, key 58 of the plug unit seal will travel along the inclined portion of keyway 61, forcing both seal members to rotate relative to the plug and receptacle manifolds, until the openings or ports 62 in the seal member 54 are aligned with the ports 50 in end wall 48, and with the bores 36". At the same time, the openings or ports 85 in the seal member 75 will be rotated into alignment with the ports 80 in end wall 78 and the bores 74 in the receptacle manifold. FIG. 9C illustrates the open position in which each port in each seal member is aligned with the respective manifold bore, providing a sealed passageway connecting the manifold bores in the plug unit to the aligned manifold bores in the receptacle unit. At this point, key 58 enters the straight portion of keyway 61, and no further rotation occurs. As the two seal members rotate, the projecting portions of the seal members will rotate in unison, tending to transport any moisture or debris away from the opposing seal faces.

The projecting portions of the seal members surrounding the passageway at the joint ensure that no seawater can enter the passageway. Since both sets of ports 62 and 85 are filled with oil or dielectric fluid when the seals are in the closed position, the fluid will be trapped in the ports as the seals rotate and will act to exclude water from the joint as the connection is made. Further inward movement of receptacle unit 12 at this point will act to further compress spring 28, moving the plug manifold 24 towards end plug 22, so that the ferrules 38 will pass through the aligned ports 62 and 85 into bores 74, and into mating engagement with ferrules 83 in the receptacle unit, making the optical connection, as illustrated in FIG. 10. The position and dimensions of the inclined and axial portions of keyway 61 are such that the seal ports will be positioned in the open position just prior to ferrule 39 reaching the first seal member 54 as it moves out of the plug unit. The optical contacts are sealed at all times in making this connection, surrounded by a bath of dielectric oil, so that seawater cannot enter the joint. The diameter of ports 62 and 85 is less than that of ferrules 39 and tubular housings 38, so that the ferrules and attached housings will expend the elastomeric material of the ports as they pass through, ensuring a good seal between each ferrule and housing and the surrounding seal material.

Conventional means such as an outer coupling sleeve (not illustrated) will be provided for releasably securing the units together once the optical connection has been made as illustrated in FIG. 10.

In an alternative embodiment, the optical fibers and sleeves may be replaced with electrical conductors for making an underwater electrical connection. The device would operate in exactly the same manner in this case, except that a socket would be provided at the end of each electrical conductor in the receptacle unit, and the electrical conductors in the plug unit would terminate with insertion terminals for engagement in the aligned sockets when the units are secured together.

This invention provides a simple, inexpensive and reliable connector for making electrical or optical cable connections in hostile environments, such as underwater and at great ocean depths. The projecting seal portions have a squeegee-like action in excluding water from the space between the mating end faces of the plug and receptacle units, and significantly reduce the risk of water leaking into the connection. The connector is easy to use by an operator working in an underwater environment when dexterity is reduced by bulky gloves and the like, and where visibility may be poor.

Although a preferred embodiment of the invention has been described above by way of example only, it will be understood by those skilled in the field that modifications may be made to the disclosed embodiment without departing from the scope of the invention, which is defined by the appended claims.

I claim:

1. An underwater connector, comprising:
    a plug unit having a hollow body and a front end wall having at least one opening, at least one probe mounted in the hollow body in alignment with the opening;
    a receptacle unit having a hollow body and a front end wall having an opening for receiving the probe when the plug and receptacle units are secured together, and at least one contact member in said hollow body in alignment with said opening; and
    a first seal member rotatably mounted in said receptacle unit behind said front end wall, said seal member having at least one port, and said first seal member and front end wall of said receptacle unit being relatively rotatable between a first position in which said port is offset from said opening and said opening is sealed and a second position in which said port is aligned with said opening for receiving said probe.

2. The connector as claimed in claim 1, further comprising a first biasing member in said receptacle unit for biasing a portion of said first seal member aligned with said opening through said opening to seal said opening against moisture entering said unit.

3. The connector as claimed in claim 1, including a second seal member rotatably mounted in said plug unit behind said front end wall, said second seal member having at least one port and said seal member and front end wall being relatively rotatable between a first position in which said port is offset from said opening and said opening is sealed and a second position in which said port is aligned with said opening.

4. The connector as claimed in claim 3, further comprising a second biasing member in said plug unit for biasing a portion of said second seal member aligned with said opening through said opening to seal said opening against moisture entering said unit; and a coupling mechanism for coupling said plug and receptacle units together with said seal members in said second positions and said probe projecting through said aligned openings and ports into said receptacle unit to contact said contact member.

5. The connector as claimed in claim 1, wherein said probe and contact member each comprise an alignment ferrule connected to an optical fiber.

6. The connector as claimed in claim 1, wherein the plug unit includes a plurality of probes extending in parallel, said first end wall has a plurality of openings, each opening being aligned with a respective one of said probes, said receptacle unit has a plurality of contact members equal in number to the number of probes and aligned with said probes when the plug and receptacle units are secured together, said second end wall has a plurality of openings each aligned with a respective contact member, and said seal member has a plurality of ports, each port being aligned with a respective one of said openings in said second position.

7. The connector as claimed in claim 1, wherein said receptacle unit comprises an outer hollow shell and a manifold body within said shell, said manifold body having an end face spaced behind said end wall with an opening aligned with said end wall opening, and defining a space between said end face and end wall in which said seal member is rotatably mounted.

8. The connector as claimed in claim 7, wherein said manifold body has a chamber containing dielectric fluid, and said manifold body has a bleed orifice extending through said end face and connecting said chamber to said space.

9. The connector as claimed in claim 8, wherein the port in said seal member is aligned with said bleed orifice in said first, closed position, whereby said port is filled with dielectric fluid when said end wall opening is sealed.

10. The connector as claimed in claim 7, wherein said end face has at least one raised bump surrounding said opening and facing said seal member, said bump comprising a biasing member urging an overlying portion of said seal member through said end wall opening to seal said opening.

11. The connector as claimed in claim 10, wherein said port in said seal member is smaller than said opening in said end wall, whereby portions of said seal member are urged through said overlying end wall opening in both said first and second positions of said seal member relative to said end wall.

12. The connector as claimed in claim 3, wherein each of said seal members has a central opening and a rigid core mounted in said opening, and each end wall has a central opening aligned with said cores, one of said cores having a pin projecting outwardly through the central opening in said end wall and the other core having a socket for receiving said pin when said units are secured together, the pin and socket being of matching, non-circular cross-section for preventing relative rotation between said seal members when said pin is engaged in said socket.

13. The connector as claimed in claim 12, wherein one of said seal members has a rigid, radially outwardly projecting key and one of said units has a keyway for receiving said key as said units are connected together, said keyway being shaped to cause said seal members to rotate from said first position to said second position as said units are urged axially towards one another.

14. The connector as claimed in claim 13, wherein one of said units has an arcuate slot and said radially projecting, rigid key extends through said slot into said keyway, said slot having opposite ends forming stops defining said first and members relations of said seal members relative to said units.

* * * * *

UNITED STATES PATENT AND TRADEMARK OFFICE
CERTIFICATE OF CORRECTION

PATENT NO. : 5,685,727
DATED : November 11, 1997
INVENTOR(S) : CAIRNS, James L.

It is certified that error appears in the above-indentified patent and that said Letters Patent is hereby corrected as shown below:

```
Column 10, claim 14, line 13: after "and" delete "members
        relations: and insert --second positions-- instead.
```

Signed and Sealed this

Fourteenth Day of July, 1998

Attest:

BRUCE LEHMAN

*Attesting Officer*        Commissioner of Patents and Trademarks